Patented June 30, 1942

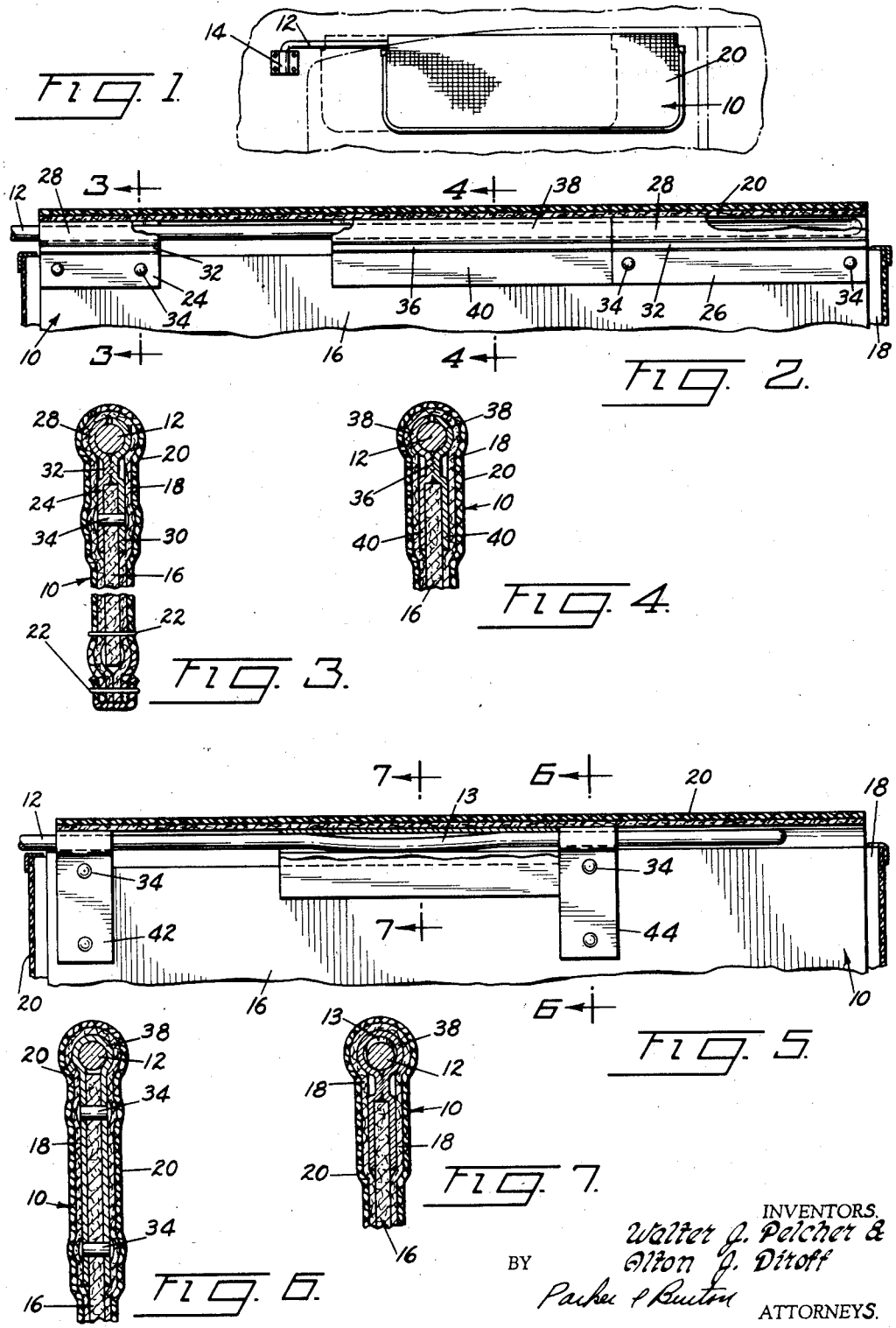

2,288,481

UNITED STATES PATENT OFFICE 2,288,481

VISOR CONSTRUCTION

Walter J. Pelcher and Alton J. Diroff, Monroe, Mich., assignors to Woodall Industries Incorporated, Detroit, Mich., a corporation of Michigan Application June 12, 1940, Serial No. 340,154

6 Claims. (Cl. 296—97)

This invention relates to an improved visor structure and particularly to that type of visor used as a glare shield or sun visor in the interior of an automobile body.

Broadly speaking, the object is to provide a visor assembly which is capable of being moved to a plurality of angular positions with respect to its support and to a plurality of positions longitudinally with respect thereto. Due to its angular adjustment it is possible to move the visor from a completely out of the way position adjacent the ceiling of the interior of the body to any one of a plurality of protective positions to obstruct to a varying degree sun glare. Due to its capacity for longitudinal adjustment it is possible to move the visor from a position adjacent to one side of the interior of the vehicle toward the centerline of the vehicle and through a determined range of such adjustment.

The invention is of the same general type as that disclosed in application Serial No. 325,298 assigned to the same assignee as this application but embodies improvements and variations in structure as compared with the construction of such earlier filed application. In this particular application, as in such earlier filed application, there is what might be termed a visor adjustment retaining element which assists in coupling the visor panel to its supporting rod and which grippingly embraces the rod to maintain the visor panel at adjusted positions of rotation about the rod. In the construction of the prior filed application this element has a portion which is grippingly embraced by a panel part to permit and maintain longitudinal adjustment.

In this particular application, this element grippingly engages the adjacent margin of the visor panel permitting slidable adjustment of the panel longitudinally of the rod and maintains the panel at said positions of longitudinal adjustment. Various modifications are illustrated but in each the adjustment retaining element grips the panel for longitudinal adjustment and grips the rod for angular adjustment.

Other objects, advantages, and meritorious features of the instant application will more fully appear from the following specification, appended claims, and accompanying drawing, wherein:

Figure 1 is a fragmentary view of the interior of an automobile body showing a visor element embodying our invention installed on the header above the windshield, Fig. 2 is a longitudinal sectional view through the visor construction and the hinge, Fig. 3 is a vertical sectional view taken on 3—3 of Fig. 2, Fig. 4 is a vertical sectional view on 4—4 of Fig. 2, Fig. 5 is a sectional view through a fragment of the visor embodying a modified form of construction and taken on the same line as the view of Fig. 2, and Figs. 6 and 7 are vertical sectional views through Fig. 5 taken on lines 6—6 and 7—7, respectively.

The visor embodies a glare shield or visor panel 10 which is supported by rod 12, which rod is pivotally mounted at one end as at 14 for swinging movement to a position to overlie the windshield or to overlie a door window opening. This particular mounting is conventional. The visor panel itself may be made of any suitable type of material which it is desired to employ. In one conventional type of construction there is an interior foundation panel 16 that may be formed of Masonite or the like. Wrapped about this panel is a multi-ply covering. The covering may comprise an inner layer 18 of suitable stiffening yet flexible material such as asphalt composition fiber board covered on the outside with a layer of cloth or artificial leather indicated as 20. This two ply laminated sheet is shown as wrapped about the stiff foundation panel 16 and as stitched through as at 22. This assembly therefore comprises a complete visor panel.

To secure this panel to the supporting rod there may be provided as shown in Fig. 2 end mountings 24 and 26 which are formed of metal and each of which comprises a tubular portion 28 and a channel portion 30. The mounting as here shown is formed in two sections which are welded or otherwise secured together as at 32 forming a web which connects the tubular portion 28 with the channel portion 30. The channel portion 30 is received over the edge of the foundation element 16 and riveted thereto as at 34. The tubular portion is of such a size as to be freely receivable over the rod 12 so as to permit relatively free rotation and slidable movement of the visor panel with respect to such rod. The view in Fig. 3 is a section through the mounting 24 and the mounting 26 at the opposite end of the panel is of a similar construction.

The panel is provided with adjustment retaining means which rotatably embraces the rod 12 and slidably embraces the panel element 16 and which is formed of metal and is generally similar in shape to the end mounting sections though differing as hereinafter described therefrom.

This adjustment retaining element is made up of two pieces welded together along a web line 36. Along one longitudinal margin the two halves are shaped so as to form a tubular portion 38. Along the other margin the two halves are shaped to provide a channel portion 40. The tubular portion 38 is of such a size as to grippingly resiliently embrace the rod 12 so that longitudinal movement thereof along such rod is exceedingly difficult.

It can be accomplished to permit insertion of the rod through the tubular portion by end pressure and rotational screwlike action but it is not sufficiently free so as to permit adjustment by a user of the panel longitudinally of the rod. Rotation however is feasible though the tubular portion 38 so resiliently grippingly embraces the rod that it will be held against accidental displacement due to jar or road travel at any position to which the panel may be adjusted angularly. The two halves which form the tube are separated against inherent tension from their normal diameter as the rod is inserted. The engagement is such as to insure the retaining element being maintained at its angular position of adjustment as described.

The channel portion 40 of this retaining element has its opposite sides so spaced apart that its engagement with the panel element 16 is one of a resilient gripping character so that such panel element is held securely in place but is permitted longitudinal adjustment through this channel to accommodate for adjustment of the visor panel per se with respect to its supporting rod.

In the construction shown in Figs. 5 to 7 the arrangement is very similar. The end mountings are here indicated as 42 and 44. The supporting rod is indicated as 12. The stiff foundation sheet is indicated as 16 as it is in the structure of Figs. 2 to 4 and the outer layers are indicated as 18 and 20, as they are in Fig. 4. The end mountings are riveted as by rivets 34 to the panel foundation. In this construction the end mountings and also the adjustment and retaining member though they comprise the same general form as heretofore described are formed of a single piece of metal bent upon itself to provide a tubular portion and a channel portion. The channel portion of the end mountings is secured by rivets to the foundation panel 16 and the channel portion of the retaining member is adapted to grippingly resiliently engage the margin of the foundation panel 16 as hereinabove described. The tubular portion of the end mountings and the tubular portion of the retaining element are indicated by the same numbers as above.

The primary difference between the structure of this modification and that above disclosed is that the supporting rod is shown as being distorted immediate its ends as at 13. This distortion is lateral and is of such a character that the rod is urged against opposite sides of the tubular part 38 of the retaining element. It is due to this distortion that as the panel is swung rotatably about the rod 12 it is held at an angular position of adjustment. The slidable adjustment of the panel within the channel and the gripping engagement of the panel foundation 16 by the side walls of the channel is as above set forth.

What we claim:

1. Visor mechanism comprising a supporting rod, a visor panel provided with a mounting freely mounted upon the rod for rotatable and longitudinal adjustment with respect thereto, panel adjustment and retaining means having a resilient tubular portion embracing the rod for rotatable adjustment thereabout and grippingly engaging the rod to maintain said positions of adjustment, said adjustment and retaining means having a channel portion projecting outwardly from the tubular portion and having resilient side walls, said panel having a marginal portion received within said channel and being slidably longitudinally adjustable therethrough, the side walls of said channel portion resiliently grippingly engaging the marginal portion of the panel so as to maintain the panel at said positions of longitudinal adjustment.

2. Visor mechanism comprising a supporting rod, a visor panel having end mountings journalled upon the rod for rotatable and longitudinal movement of the panel with respect to the rod, a visor adjustment and retaining element having a resilient tubular portion grippingly engaging the rod between the end mountings of the panel and having a resilient channel portion grippingly embracing the adjacent margin of the panel between the end mountings, said tubular portion grippingly engaging the rod for adjustable rotation thereabout and adapted to maintain the panel at said positions of rotatable adjustment, said channel portion grippingly engaging the panel to permit slidable adjustment of the panel therethrough.

3. Visor mechanism comprising a supporting rod, a visor panel having end mountings each comprising a tubular portion embracing the rod for rotatable and longitudinal movement of the panel with respect to the rod and a channel portion embracing the adjacent margin of the panel and fixed thereto, a visor adjustment and retaining element comprising a tubular portion grippingly resiliently embracing the rod between the end mountings of the panel thereon and having a channel portion grippingly resiliently engaging the adjacent margin of the panel between the end mountings, said tubular portion grippingly engaging the rod for adjustable rotation thereabout and adapted to maintain the panel at said positions of rotatable adjustment, said channel portion grippingly engaging the panel to permit slidable adjustment of the panel therethrough and adapted to maintain the panel at said positions of slidable adjustment.

4. The structure defined in claim 2 characterized in that the end portions of the rod upon which the end mountings of the panel are journalled are substantially straight and the intermediate portion of the rod embraced by said adjustment and retaining element is characterized by a lateral distortion which resists relative movement of the rod within the tubular portion of the retaining element.

5. The structure defined in claim 3 characterized in that the end mountings of the panel and the adjustment and retaining element each comprise a split resilient tubular portion extending along one longitudinal margin and an open resilient channel portion extending along the opposite longitudinal margin, said two portions being connected by an intervening integral web portion.

6. Visor mechanism comprising, in combination, a supporting rod, a visor panel having a mounting journalled upon the rod for rotatable and longitudinal adjustment of the panel with respect to the rod but not adapted to maintain the panel in said positions of adjustment, panel adjustment retaining means coupling the panel with the rod and having a resilient tubular portion embracing the rod and rotatably adjustable thereover and having a resilient channel portion grippingly engaging one longitudinal margin of the panel for slidable adjustment of the panel therethrough, said resilient channel portion so grippingly engaging the margin of the panel as to maintain the panel in the position of longitudinal adjustment therethrough and to hold the panel to rotate with said adjustment retaining means about the rod, said resilient tubular portion so grippingly embracing the rod as to maintain the panel at positions of rotatable adjustment of said adjustment retaining means about the rod.

WALTER J. PELCHER.
ALTON J. DIROFF.